June 29, 1954   R. S. ENABNIT   2,682,638
SIGNAL POWERED BRIDGE AMPLIFIER
Filed Nov. 13, 1950

*INVENTOR.*
ROBERT S. ENABNIT
BY
R. L. Miller
ATTORNEY

Patented June 29, 1954

2,682,638

UNITED STATES PATENT OFFICE 2,682,638

SIGNAL POWERED BRIDGE AMPLIFIER

Robert S. Enabnit, Cuyahoga Falls, Ohio, assignor, by mesne assignments, to The Goodyear Tire & Rubber Company, a corporation of Ohio Application November 13, 1950, Serial No. 195,215

5 Claims. (Cl. 324—140)

This invention relates to a signal powered bridge amplifier, and, more particularly, to an amplifier which detects the deviation in the relationship of the amplitude of two voltage signals and produces an amplified output signal which is a function of this deviation.

While methods of detecting and amplifying the deviation of the amplitude of one voltage signal relative to another have been proposed in the prior art, such circuits have usually required a separate power supply to energize the amplifier. This necessarily restricts the use of said circuits to installations where power is readily available, or requires the use of batteries. The additional expense of building and maintaining such circuits is obvious. Moreover, known systems have been relatively complicated and expensive.

It is the general object of the invention to avoid and overcome the foregoing and other difficulties of and objections to prior art practices by the provision of a bridge amplifier having a minimum of components, which is less expensive to construct and maintain, and which is extremely sensitive to small differences in signal strength.

Another object of the invention is to provide a bridge amplifier which is powered by the input signal.

Another object of the invention is to provide a bridge amplifier which accurately detects and amplifies small deviations in the relative amplitude of two signals, whether they be A. C. or D. C. voltages.

Another object of the invention is the provision of a signal powered bridge amplifier which detects deviations in the relative amplitude of two signals regardless of their initial relative amplitude.

The aforesaid objects of the invention and other objects which will become apparent as the description proceeds, are achieved by providing a signal powered bridge for amplifying the deviation in the relationship of the amplitude of two voltage signals including a pair of triodes, a plate load resistor in series with the plate of one triode, a second plate load resistor in series with the plate of the other triode, the plate load resistors connecting the plates to a common point, a bias resistor in series with the cathode of one triode, a signal input resistor in series with the bias resistor and the common point, a second bias resistor in series with the cathode of the other triode, a signal input potentiometer having the wiping contact connected to the second bias resistor and one end connected to the common point, the grid of each triode being connected to the cathode of the other triode through the bias resistor in series with the other triode, the voltage signals being applied one across the signal input resistor and the other across the ends of the signal input potentiometer, the output signal of the bridge being taken from between the plates.

For a better understanding of the invention, reference should be had to the accompanying drawings, wherein.

Figure 1:
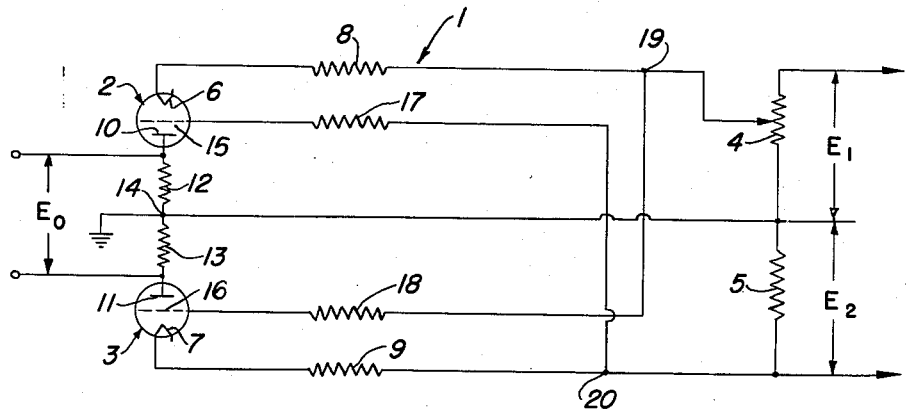
Fig. 1 is a schematic wiring diagram of one embodiment of the invention particularly applicable for use with D. C. signal voltages.

With specific reference to the form of the invention illustrated in the drawings, the numeral 1 indicates generally a bridge amplifier circuit having a pair of vacuum tubes 2 and 3 preferably triodes such as tube type 9002.

The plate voltage on the tubes is derived from the D. C. signal voltage applied across the input signal resistors 4 and 5. Either or both of resistors 4 and 5 may be incorporated as potentiometers. This is desirable where the average D. C. amplitude of one signal is greater than that of the other signal. By means of the potentiometer the voltages derived from the two signals can be initially balanced.

In series with the cathodes 6 and 7 are the bias resistors 8 and 9, and in series with the plates 10 and 11 are the plate load resistors 12 and 13. The plate load resistors are connected to the common point 14 to which the input signal resistors 4 and 5 are connected. The bias resistors 8 and 9 are in series with the input signal resistors 4 and 5 respectively. It will be appreciated that the D. C. signals are applied such that the common point 14 is at a positive potential. This makes it necessary that the two D. C. signals have a common positive lead.

The grids 15 and 16 are connected through current limiting resistors 17 and 18 respectively to the cathode bias resistor of the other tube at 19 and 20 respectively so that the grids respond to changes in signal voltage applied to the opposite tube. The amplified output voltage is taken between the plates 10 and 11.

In operation, if initially the two D. C. signals are at the same potential, and the bridge balanced, then the potential on the grids is the same, and the voltage drop across the two plate load resistors 12 and 13 is the same. The potential difference between the two plates 10 and 11 is zero. If one signal increases slightly, say that applied across input resistor 4, the plate voltage of tube 2 is increased, and the potential of the grid 16 of tube 3 is increased with the result that tube 2 becomes more conductive and tube 3 becomes less conductive. This causes the potential of plate 10 to become more negative with respect to plate 11. Likewise, if the signal decreases slightly across input resistor 4, the potential of plate 10 becomes less negative with respect to plate 11.

Figure 3:
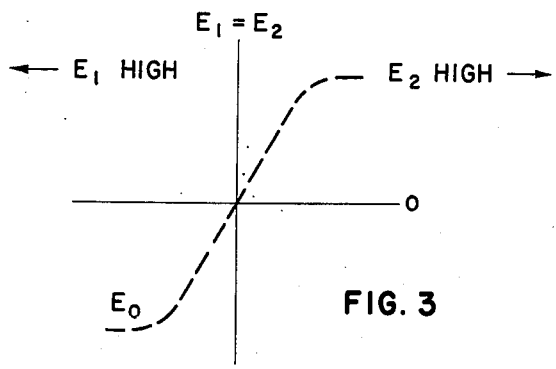
Fig. 3 is a graph showing the relation between the input voltage deviation and the output error signal.

By virtue of the control grid amplification factor of the tubes, the plate voltage changes considerably more than the grid voltage, so that the output voltage as taken across the plates 10 and 11 is considerably greater than the voltage deviation between the two input signals. As the deviation increases, the voltage gain becomes considerably less, so that the bridge circuit characteristically has maximum sensitivity for small deviations. This is a particularly desirable feature where the output signal is used to correct the input signal deviation in a closed servo system. The relation between the deviation between the input signals and the resulting output error signal as measured across the plates 10 and 11 is graphically illustrated in Fig. 3. It will be seen that the maximum change in error voltage occurs for small deviations around zero.

Figure 2:
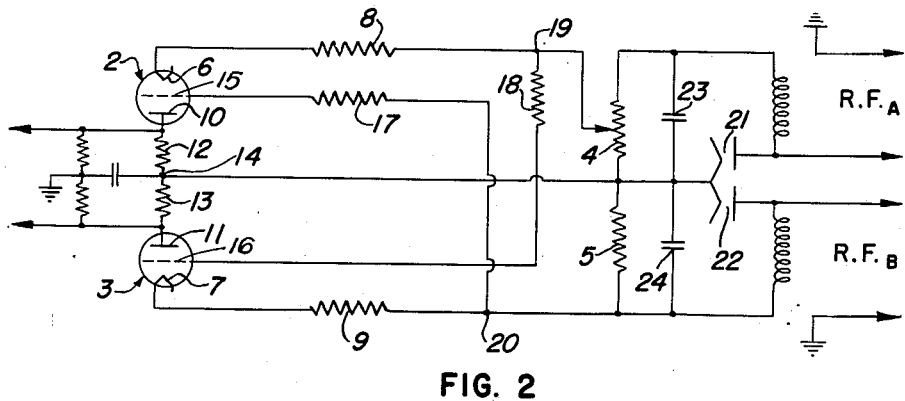
Fig. 2 is a schematic wiring diagram of the signal powered bridge amplifier for use with A. C. voltage signals.

A modified form of the invention is illustrated in Fig. 2, which is particularly adapted to be used with alternating voltage signals. Here the signals are applied across the input signal resistors 4 and 5 as in Fig. 1 except that rectifiers 21 and 22 are in series with the two A. C. signals respectively. The rectifiers are incorporated with their cathodes connected to the common point 14 so that the polarity of the rectified signal applied to the resistors 4 and 5 is the same as the D. C. signals applied in the modification of Fig. 1. Filter condensers 23 and 24 are connected across the resistors 4 and 5 respectively to smooth the rectified voltage. The output signal between the plates of the triodes is as before, a function of the deviation in amplitude of the one A. C. signal in respect to the other.

From the above description, it will be recognized that the objects of the invention have been achieved by providing a bridge amplifier that produces an output voltage which is a function of the deviation between two input voltages but which is of magnitude considerably greater than the difference in voltage between the two input signals. The bridge has maximum sensitivity around the balance point, and obtains this voltage gain without the need of a power supply, the bridge being completely powered by the input signals.

While certain representative embodiments and details have been shown for the purpose of illustrating the invention, it will be apparent to those skilled in this art that various changes and modifications may be made therein without departing from the spirit or scope of the invention.

I claim:

1. A signal powered bridge for amplifying the deviation in the relationship of the amplitude of two voltage signals including a pair of triodes, a plate load resistor in series with the plate of one triode, a second plate load resistor in series with the plate of the other triode, said plate load resistors connecting the plates to a common point, a bias resistor in series with the cathode of one triode, a signal input resistor shunting the signal input and in series with the bias resistor and said common point, a second bias resistor in series with the cathode of the other triode, a signal input potentiometer shunting the second signal input and connected between said second bias resistor and said common point, the grid of each triode being connected in the circuit only by being connected to the cathode of the other triode through the bias resistor in series with the other triode, said voltage signals being applied one across the signal input resistor and the other across the ends of the signal input potentiometer in such manner that the common point is of positive polarity, and output signal connections to the plates of the triodes.

2. A signal powered bridge for amplifying the deviation in the relationship of the amplitude of two D. C. voltage signals including a pair of vacuum tubes, a plate load resistor in series with the plate of one vacuum tube, a second plate load resistor in series with the plate of the other vacuum tube, said plate load resistors connecting the plates to a common point, a bias resistor in series with the cathode of one vacuum tube, a signal input resistor in series with the bias resistor and said common point, a second bias resistor in series with the cathode of the other vacuum tube, a signal input potentiometer connected between said second bias resistor and said common point, the control grid of each vacuum tube being connected in the circuit only by being connected to the cathode of the other vacuum tube through the bias resistor in series with the other vacuum tube, said D. C. voltage signals being applied one across the signal input resistor and the other across the ends of the signal input potentiometer in such manner that the common point is of grounded positive polarity, and output signal connections to the plates of the triodes.

3. A signal powered circuit for amplifying the deviation in the relationship of the amplitude of two D. C. voltage signals including a pair of vacuum tubes, a plate load resistor in series with the plate of one vacuum tube, a second plate load resistor in series with the plate of the other vacuum tube, said plate load resistors connecting the plates to a common point, a bias resistor in series with the cathode of one vacuum tube, a signal input resistor in series with the bias resistor and said common point, a second bias resistor in series with the cathode of the other vacuum tube, a second signal input resistor in series with said second bias resistor and said common point, the control grid of each vacuum tube being connected in the circuit only by being connected to the cathode of the other vacuum tube through the bias resistor in series with the other vacuum tube, said D. C. voltage signals being applied one across the signal input resistor and the other across the second signal input resistor in such manner that the common point is of grounded positive polarity, the output signal of the circuit being taken between the plates.

4. A signal powered circuit for amplifying the deviation in the relationship of the amplitude of two A. C. voltage signals including a pair of vacuum tubes, a plate load resistor in series with the plate of one vacuum tube, a second plate load resistor in series with the plate of the other vacuum tube, said plate load resistors connecting the plates to a common point, a bias resistor in series with the cathode of one vacuum tube, a signal input resistor in series with the bias resistor and said common point, a second bias resistor in series with the cathode of the other vacuum tube, a second signal input resistor in series with said second bias resistor and said common point, the control grid of each vacuum tube being connected to the cathode of the other vacuum tube through the bias resistor in series with the other vacuum tube, a condenser across each of said signal input resistors, said A. C. voltage signals being applied one across the signal input resistor and the other across the second signal input resistor, and a rectifier connected in series with each signal source and said common point in such manner that the common point is of positive polarity, and output signal connections to the plates and common point.

5. A signal powered bridge for amplifying the deviation in the relationship of the amplitude of two A. C. voltage signals including a pair of vacuum tubes, a plate load resistor in series with the plate of one vacuum tube, a second plate load resistor in series with the plate of the other vacuum tube, said plate load resistors connecting the plates to a common point, a bias resistor in series with the cathode of one vacuum tube, a signal input resistor in series with the bias resistor and said common point, a second bias resistor in series with the cathode of the other vacuum tube, a second signal input resistor in series with said second bias resistor and said common point, the control grid of each vacuum tube being connected to the cathode of the other vacuum tube through the bias resistor in series with the other vacuum tube, said A. C. voltage signals being applied one across the signal input resistor and the other across the second signal input resistor, means for rectifying said A. C. signals in such manner that the common point is of positive polarity, the output signal of the bridge being taken between the plates.

References Cited in the file of this patent

UNITED STATES PATENTS

| Number | Name | Date |
|---|---|---|
| 2,085,488 | Woodward et al. | June 29, 1937 |
| 2,509,389 | Blake | May 30, 1950 |
| 2,523,240 | Vackar | Sept. 19, 1950 |
| 2,498,103 | Wojciechowski | Feb. 21, 1950 |

FOREIGN PATENTS

| Number | Country | Date |
|---|---|---|
| 970,250 | France | Jan. 2, 1951 |